United States Patent [19]
Bricaud et al.

[11] Patent Number: 5,807,124
[45] Date of Patent: Sep. 15, 1998

[54] CARD CONNECTOR WITH SWITCH

[75] Inventors: Hervé Guy Bricaud; Fabrice Valcher, both of Dole, France

[73] Assignee: ITT Manufacturing Enterprises, Inc., Wilmington, Del.

[21] Appl. No.: 986,857

[22] Filed: Dec. 8, 1997

Related U.S. Application Data

[63] Continuation of Ser. No. 588,536, Jan. 18, 1996, Pat. No. 5,775,937, and a continuation-in-part of PCT/FR95/00708, May 31, 1995, PCT/FR95/00709, May 31, 1995, PCT/FR95/00710, May 31, 1995.

[51] Int. Cl.$^6$ ................................................. H01R 29/00
[52] U.S. Cl. ........................ 439/188; 439/260; 200/51.09
[58] Field of Search .................. 439/65, 74, 76, 439/92, 489, 188, 260, 630; 200/51.09, 51.1, 51.11

[56] References Cited

U.S. PATENT DOCUMENTS 3,638,033  1/1972  Johnson .

FOREIGN PATENT DOCUMENTS

| | | |
|---|---|---|
| 0274534 | 1/1988 | European Pat. Off. . |
| 0274288 | 7/1988 | European Pat. Off. . |
| 0316699 | 5/1989 | European Pat. Off. . |
| 0366513 | 5/1990 | European Pat. Off. . |
| 0474519 | 3/1992 | European Pat. Off. . |
| 0568971 | 11/1993 | European Pat. Off. . |
| 0587497 | 3/1994 | European Pat. Off. . |
| 2658364 | 8/1991 | France . |

*Primary Examiner*—Khiem Nguyen
*Attorney, Agent, or Firm*—Thomas L. Peterson

[57] ABSTRACT

A connector is provided for use with a microcircuit card that has contact pads on its lower face, which assures that connector contact blades fully engage the card pads when full insertion of the card is detected. The connector includes a body with a contact body portion that holds the card-engaging contacts and a switch body portion that holds a switch with an actuator. The body portions are integral and have coplanar upper faces which assures precision relative positioning of the card-engaging blades and the actuator that detects full insertion of the card. The switch body portion is preferably offset from the contact body portion, which facilitates routing of circuit board conductors when the connector is mounted on a circuit board, especially where the connector has surface mount terminals. The switch actuator has a fixed rear end and two forward arms, one for depression by a card and the other for depressing and releasing a snap dome. The body has recesses at its periphery, to facilitate heating of surface mount terminals.

7 Claims, 7 Drawing Sheets

CARD CONNECTOR WITH SWITCH

This is a continuation of patent application Ser. No. 08/588,536 filed Jan. 18, 1996, now U.S. Pat. No. 5,775,937 which is a 371 of International Applications PCT/FR95/00708, filed May 31, 1995. PCT/FR95/00709 filed May 31, 1995, and PCT/FR95/00710 filed May 31, 1995, all of which designated the United States, and which respectively claimed priority from French patent applications FR 9406683 filed Jun. 1, 1994, FR 9406684 filed Jun. 1, 1994, and FR 9406685 filed Jun. 1, 1994.

BACKGROUND OF THE INVENTION

The present invention relates to an electrical connector for connection to a microcircuit card, of a type which has a lower face with contact pads thereon. The connector has contact elements with upwardly projecting contact blades that engage the pads on the lower face of the card when the card is fully inserted into a read/write device in which the connector is mounted. It is necessary to determine when the card has been fully inserted, and for the card contact pads to be engaged with the contact blades at that time. One prior type of connector has a case that forms a card receiving slot, that holds card-engaging contacts, and that holds a switch actuator that is deflected by the front edge of a card. That construction necessitates producing a specific complete case with built in connector and actuator for each application. Another prior connector has an electrical connector device of small size, and a separate switch, each of which is mounted on a circuit board in a case. That design gives rise to the possibility that the contacts of the connector device and the full-insertion detecting switch will not be precisely positioned relative to each other, so the contacts will not all engage the card pads when the switch detects full insertion.

Prior actuators for detecting the full insertion of a card have generally included a resilient blade that is deflected against a contact The blades generally press upwardly with substantial force against the front of the card, which tends to lift the card.

SUMMARY OF THE INVENTION

The present invention provides apparatus for a device that receives a microelectric card, to detect full insertion of the card so electrical connections can be made to card pads. One embodiment of the invention includes an electrical connector with contact blades for connection to pads of the microcircuit card, and with a switch for detecting full insertion of the card. The connector includes a body of insulating material with an upper surface that lies adjacent to the lower surface of an inserted microcircuit card. The body has a first rectangular body portion that holds electrical contacts with resiliently deflectable blades that project above the body upper surface to engage card pads. The body has a second body portion, integral with the first portion, that extends from one side of the front edge of the first portion, the second body portion holding a switch that detects full card insertion. This arrangement enables the provision of two rows of electrical contacts in the first body portion with tails accessible respectively from the front and rear ends of the first portion for soldering to the circuit board, and also provides access to tails of switch conductors at the front edge of the second body portion. Access is facilitated by forming recesses in the body, where the tails lie, which is especially important for surface mount terminals. The provision of a single body assures a continuous upper surface without steps that could damage the card, and assures accurate positioning of the full insertion-detecting switch relative to the contacts, all in a compact arrangement.

The switch can include an actuator in the form of a resiliently deflectable sheet metal blade. The actuator can include a rear end that is fixed to the body, and a first arm with a front free end forming a ramp that projects above the body upper surface. The actuator has a bearing point that engages a snap dome, and the bearing point can be located on a second arm, to allow the dome to snap more freely.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
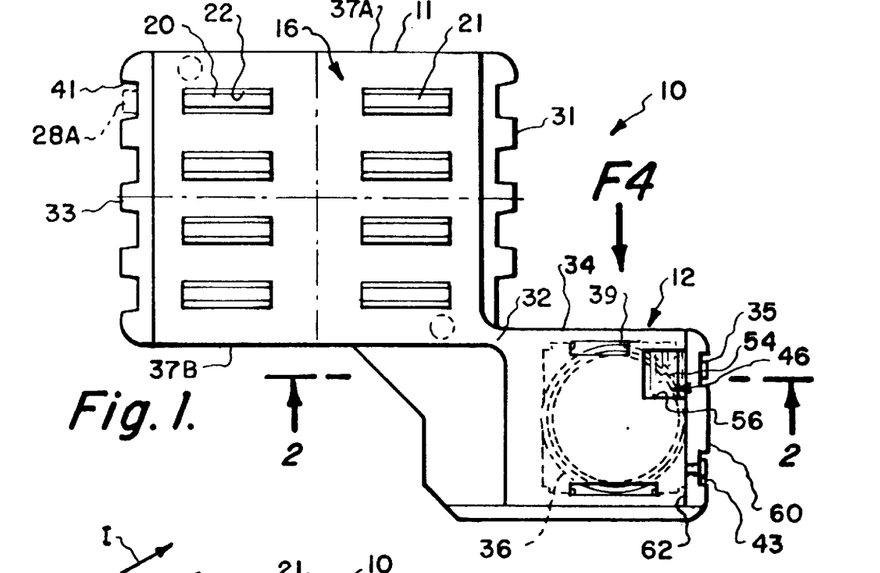
FIG. 1 is a plan view of the electrical connector of FIG. 1A.
Figures 1A, 1B:
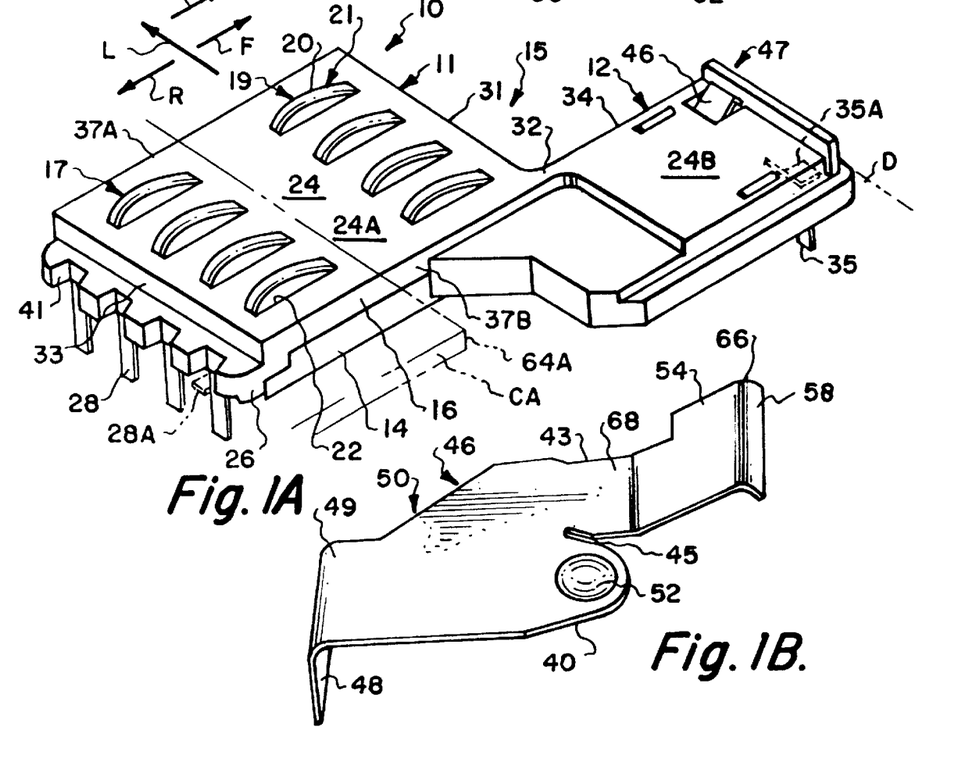
FIG. 1A is an isometric view of an electrical connector of a first embodiment of the invention, showing, in phantom lines, a partially inserted narrow card.
FIG. 1B is an isometric view of the switch actuator of the connector of FIG. 1A.

FIG. 1A illustrates a connector unit or connector 10 that includes a body 15 with a contact body portion 11 and a switch body portion 12. The contact body portion 11 holds two rows 17, 19 of contacts 21 that each has a contact blade 20 that is elongated in forward and rearward directions F, R. The body has an upper surface or face 24 along which a microcircuit card moves, the body upper surface including continuous, coplanar surface portions 24A, 24B on the two body portions. The contact blades 20 project above the surface to engage contact pads 25 (FIG. 2) at the lower surface of the card C. The switch body portion 12 (FIG. 1A) holds a switch assembly or switch 47 with a switch actuator 46 that detects the leading edge of a card that is inserted in an insertion direction I which is parallel to the forward direction F.

Figure 9:
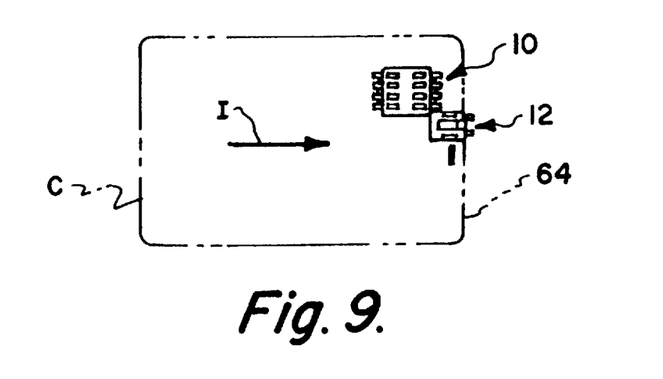
FIG. 9 is a plan view of the connector of FIG. 1 and of a full size microcircuit card, showing their relative sizes.

A read/write device D that includes the connector 10, commonly has circuitry that passes signals through the contact blades 20 and through contact pads on the microcircuit card, only when the card is in its fully inserted position. The card is detected as lying in its fully inserted position by the switch assembly 47. It is important that the position of the switch actuator 46 be accurately fixed with respect to the contact blades 20. FIG. 1A shows a very narrow card CA, with a forward edge 64A, the card being shown only partially installed. FIG. 9 shows a more common full size microcircuit card C with its forward edge 64 shown fully inserted, and also shows the connector 10. The small size of the connector 10 with respect to the full size card C can be readily appreciated from the figure.

The connector 10 of FIG. 1A is designed to be mounted on a printed circuit board of the device D, the device D having slot walls (not shown) that guide opposite sides of the card during its insertion into the device. The body 15 includes a base 14 and a cover 16 that lies over the base, both being formed of molded plastic. The cover 16 has a plurality of slots 22 through which the contact blades project The contacts have lower ends forming terminals 28 that enable it to be plugged into a circuit board that has plated holes, to be soldered thereat.

The contact body portion 11 of the body 15 is of substantially rectangular shape as seen in a plan view, with front and rear ends 31, 33 and with opposite sides 37A, 37B. The switch body portion 12 extends from an intersection location 32 at the corner of the contact portion 11 which is at the front 31 and second side 37B thereof, and extends forwardly and laterally (along direction L) beyond the side 37B.

For the connector 10 of FIG. 1A, the offsetting (in the lateral direction L) of the switch body portion 12 from the contact body portion 11, is useful in avoiding cramming of the circuit board. That is, there are already two rows of terminals 28 for the contacts 21. The additional pair of terminals 35 for the switch conductors are spaced further from the terminals 28, to provide more room on the circuit board.

Figure 22:
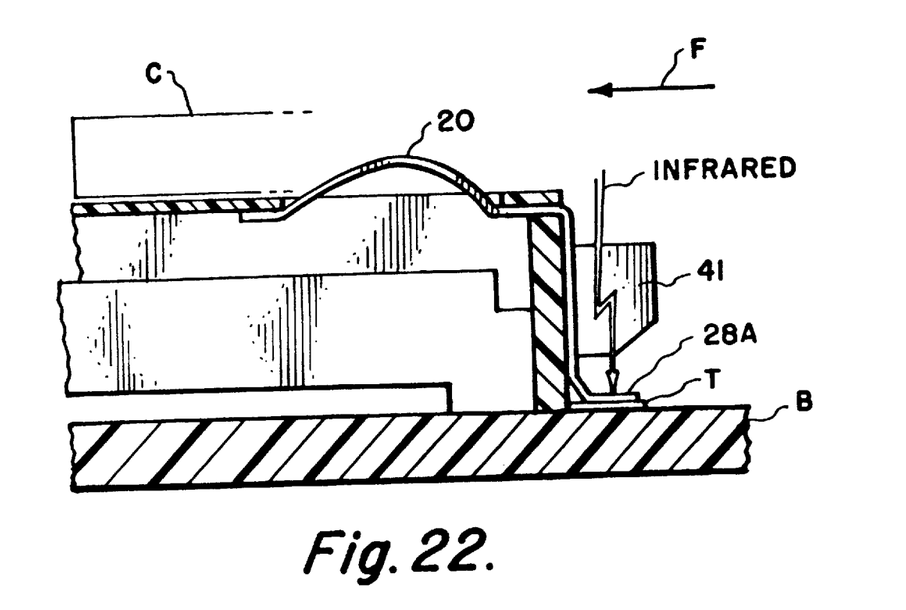
FIG. 22 is a partial sectional side view of the connector of FIG. 16, shown mounted in another arrangement on a circuit board.

In another embodiment of the invention, the connector 10 is constructed for surface mounting, wherein surface-mount terminals 28A are provided for the contacts and additional terminals 35A are provided for the switch conductors. The terminal ends lie slightly below the bottoms 26 of the body portions. The body 15 is formed to accommodate either of these forms of terminals. The body has recesses or cutouts 41 at its periphery to surround the surface mount portions of the terminals 28A to protect them from harm, while still providing an opening from the top of the connector. The opening formed by cutouts 41, enable soldering to circuit board traces by downwardly-directed infrared heat or by downwardly-moving soldering iron tips that pass down along the cutouts 41. FIG. 22 shows how infrared heat can be directed down through a cutout 41 to solder the terminal 28A to a trace T on a circuit board B. The lateral offsetting of the body switch portion 12, enables cutouts such as 41, 43 (FIG. 1) to be provided for all of the terminal ends, of both the contacts 21 and the switch conductors.

The switch actuator 46 (FIG. 1A) lies close to a first side 37B of the switch body portion 12. This assures that the actuator 46 will detect very narrow cards such as shown at CA, whose width would not extend laterally much beyond the switch 46. Most microcircuit cards have a much greater width.

Figure 7:
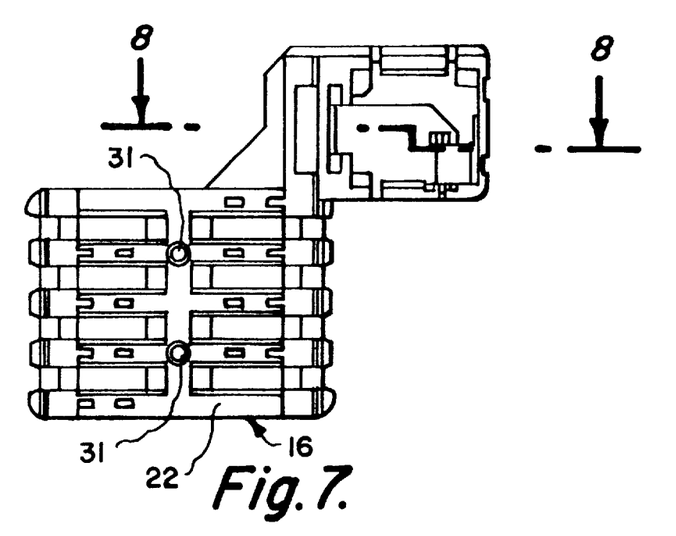
FIG. 7 is a bottom view of the cover of the body of the connector of FIG. 1.
Figure 8:
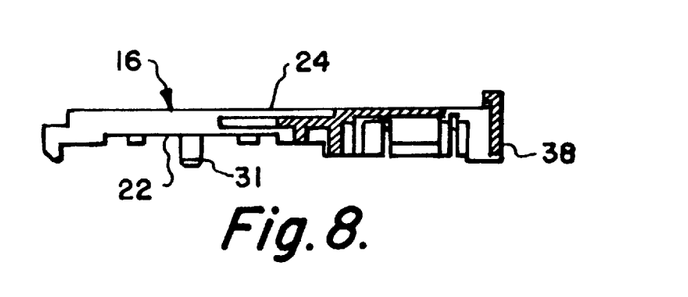
FIG. 8 is a view taken on line 8—8 of FIG. 7.

As shown in FIG. 7, the lower face 22 of the cover 16 of the housing has studs 31 for relative positioning of the cover 16 to the base 14.

Figures 2, 3, 4, 5, 6:
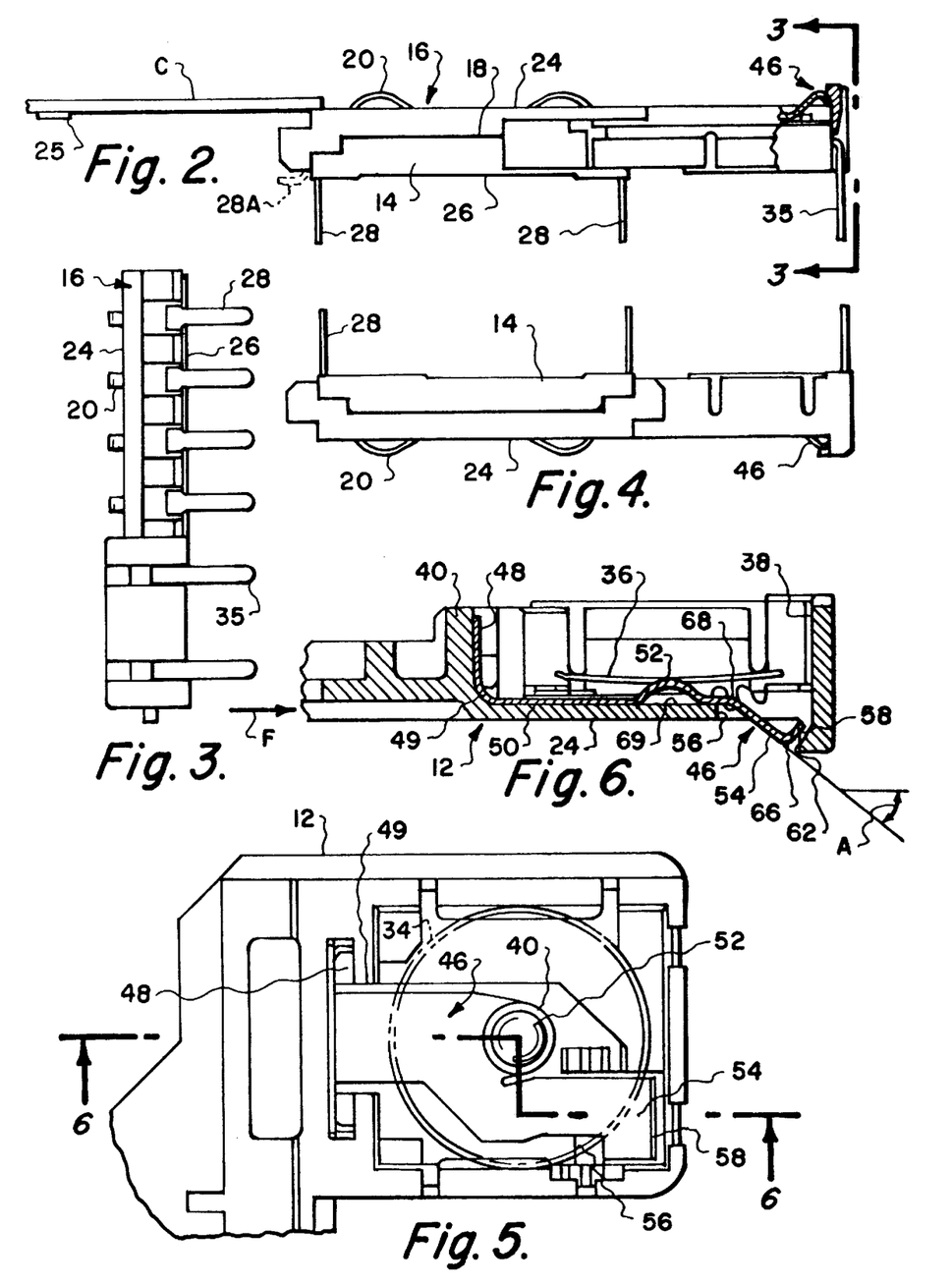
FIG. 2 is a partially sectional side view taken on line 2—2 of FIG. 1.
FIG. 3 is a view taken on line 3—3 of FIG. 2.
FIG. 4 is an upside-down view of the connector of FIG. 1 as seen along arrow F-4 thereof.
FIG. 5 is a bottom view of a switch portion of the connector of FIG. 1.
FIG. 6 is an upside-down view taken on line 6—6 of FIG. 5.

As shown in FIG. 1, the switch portion 12 of the body has a cylindrical wall 39 for holding a snap dome-type switch element. As shown in FIG. 6, the switch includes a monostable switch element or snap dome 36. The actuator 46 for operating the switch, is a sheet metal, resiliently deflectable metal blade. A first end 48 of the actuator is fixed to insulation of the body switch portion 12, and is preferably embedded therein. A curved connection region 49 connects the fixed end 48 to a main part 50 that includes a circular depressed region or bearing location 52 that lies over the center of the dome element 36. An actuator region 68 is bent to lie substantially in a horizontal plane and bears against a surface 69 on the switch body portion 12 to accurately position that actuator region. A ramp 54 extends at an upward-forward incline (angle A of over 20°) therefrom, through an opening 56, to a peak 66, the actuator having a turned-down part 58 at its front end. It can be seen from FIG. 5 that the bearing location 52 which directly presses against the dome, lies along a short separate arm 40. This allows the location 52 to suddenly move up or down as the dome snaps, with reduced resistance from the rest of the actuator.

The actuator pivots largely by bending at the location 49. The switch body portion 12 forms an upstanding part 60 (FIG. 6) that projects above the body upper face 24, and that forms a limit stop surface 62 that limits forward movement of a card. When a card is fully inserted, the peak 66 is depressed and snaps down the dome, so the peak 66 thereafter exerts only a small upward force against the card. The ramp 54 bends partially around the location 68, which decreases the force required by the card to depress the peak 66 to close the switch. Bending at 68 also permits the peak 66 to be depressed further than that required for snapping down of the middle of the dome 36, to thereby enable effective operation despite tolerances in manufacture. This also minimizes any tendency for the switch actuator to lift the card. Thus, the use of a snap dome to make electrical contact, minimizes upward force against the inserted card (after the dome snaps), and the actuator construction further minimizes such upward force.

FIG. 1B shows that the main portion 50 of the actuator has two arms 40, 43 with a slot 45 between them. This construction allows the bearing location 52 to suddenly move down or up as the dome snaps down or unsnaps up. The use of a snap dome results in a "click" being heard and felt when the card becomes fully inserted, which is desirable.

The integration of the body portions 11, 12 (FIG. 1A) into a single body, preferably with a continuous coplanar upper surface 24, assures accurate positioning of the contact blades 20 with respect to the switch actuator 46. This assures that when the switch actuator 46 is depressed by a fully inserted card, that the pads on the card will be engaged by the contact blades 20. Also, the continuous upper surface 24 avoids the possibility of an up-step that could cause the leading edge of the card to abut the rear edge of the upper surface of the body portion 12 or to cause wear on the card lower surface. As described above, the construction of the switch actuator 46 enables switch operation with bending that permits substantial tolerances in manufacture. The construction of the connector 10 with pad-engaging contact blades 20 and an insertion detector actuator 46, enables the same connector 10 to be used for a wide range of card-receiving devices.

Figures 10, 12:
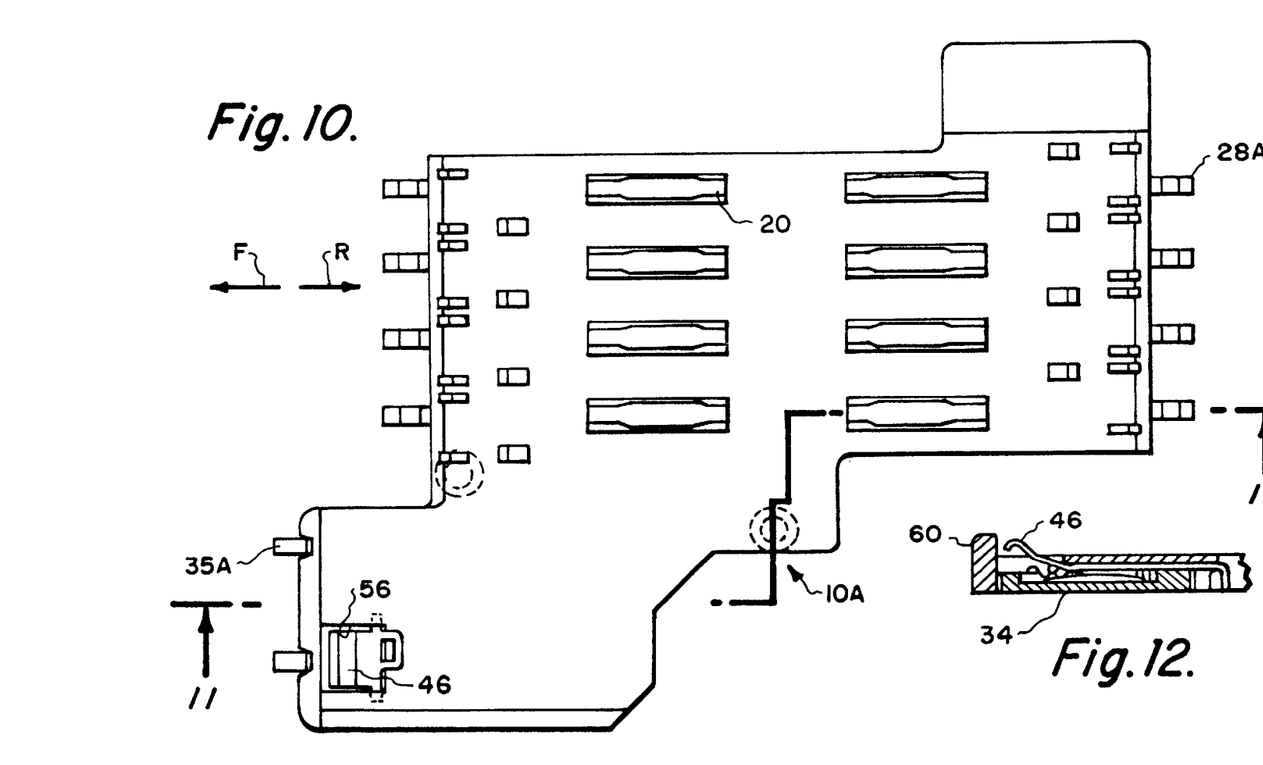
FIG. 10 is a plan view of a connector constructed in accordance with another embodiment of the invention.
FIG. 12 is a sectional view of a portion of a connector showing a portion thereof which is a substitute for a similar portion shown in FIG. 11.
Figure 11:
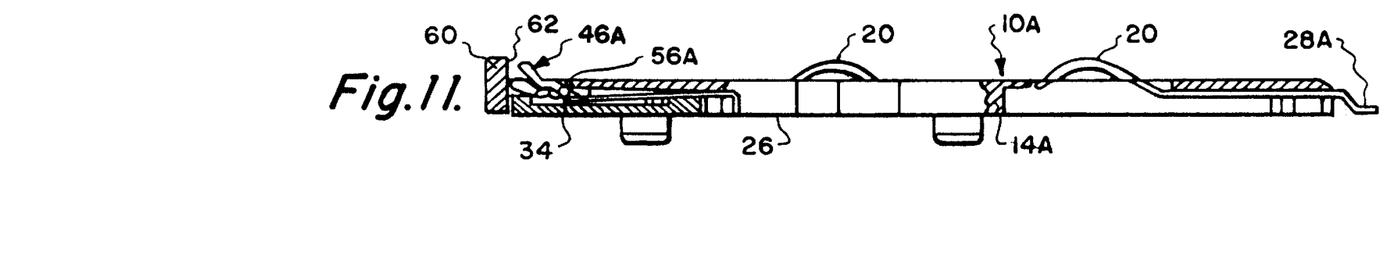
FIG. 11 is a view taken on line 11—11 of FIG. 10.

FIGS. 10–12 illustrate a modified connector 10A with a single molded base 14A of small thickness. The switch actuator 46A projects up through a slot 56A. In FIG. 12, the switch is of the normally open type, and the actuator 46 is of the same construction as shown in FIGS. 1–9. However, in FIGS. 10 and 11, the switch is of the normally closed type, so operation of the actuator 46A to depress its front end, allows the middle of a snap dome to move up so the dome unsnaps. Of course, a variety of switches besides snap-dome types can be used. Also, a monostable dome can be inverted so the actuator 46 of FIGS. 1–9 and 12 can be used for a normally closed switch. For some applications two switches can be used, one normally open and the other normally closed.

Figure 13:
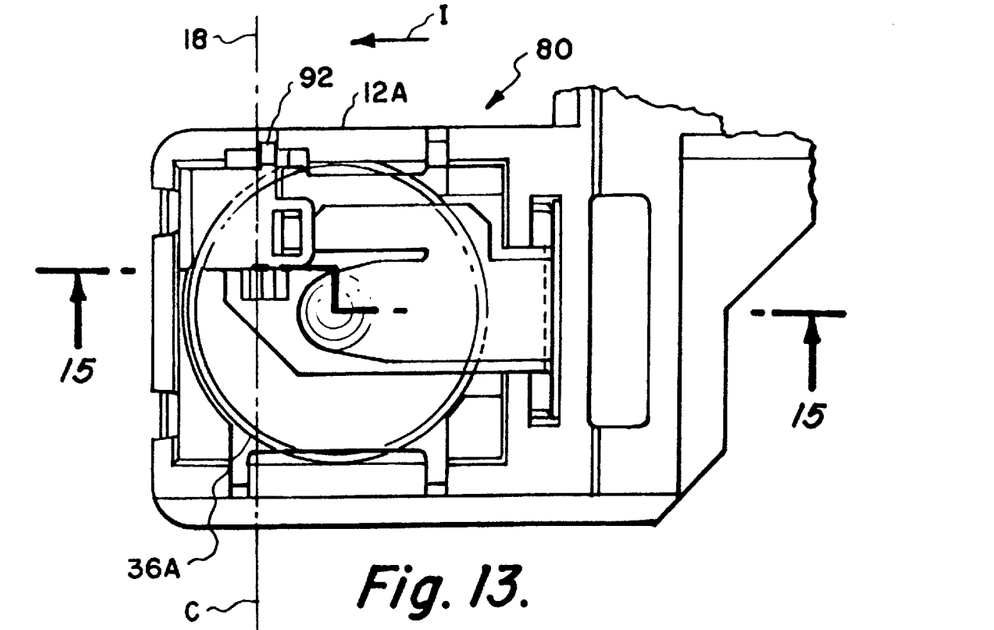
FIG. 13 is a top view of a portion of a connector constructed in accordance with yet another embodiment of the invention, wherein the actuator has an additional part
Figure 14:
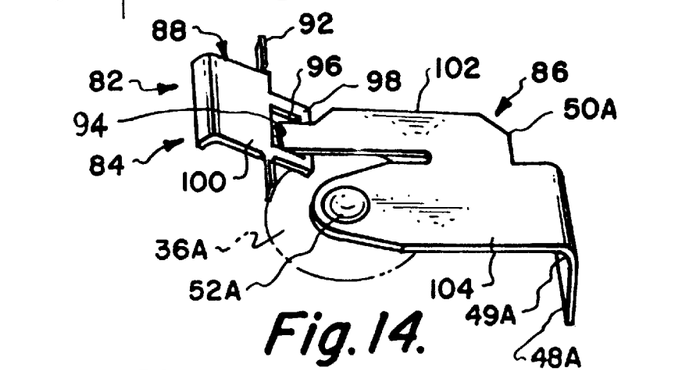
FIG. 14 is an isometric view of the actuator of FIG. 13.
Figure 15:
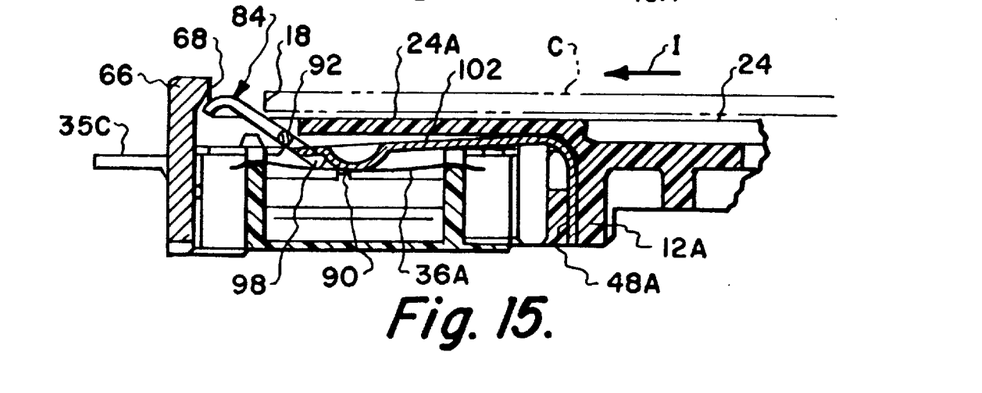
FIG. 15 is a view taken on line 15—15 of FIG. 13.
Figure 16:
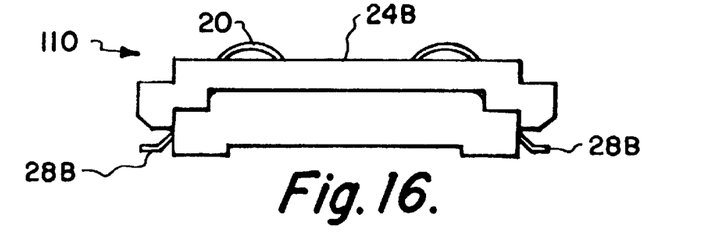
FIG. 16 is a side view of a connector of another embodiment of the invention, which has surface mount terminals.
Figure 17:
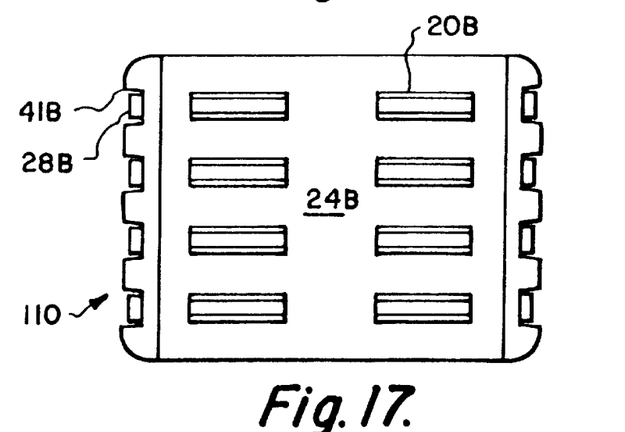
FIG. 17 is a top view of the connector of FIG. 16.
Figure 18:
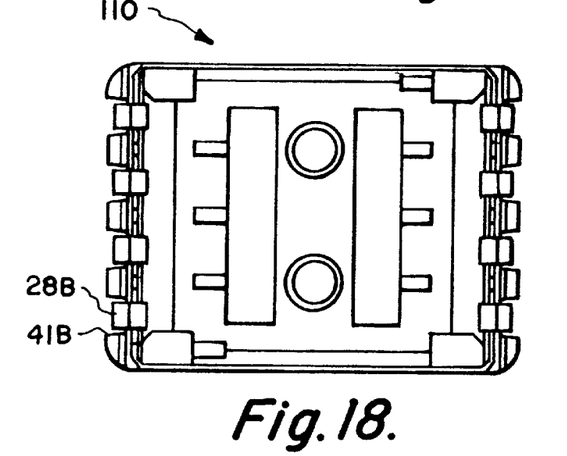
FIG. 18 is a bottom view of the connector of FIG. 16.
Figure 19:
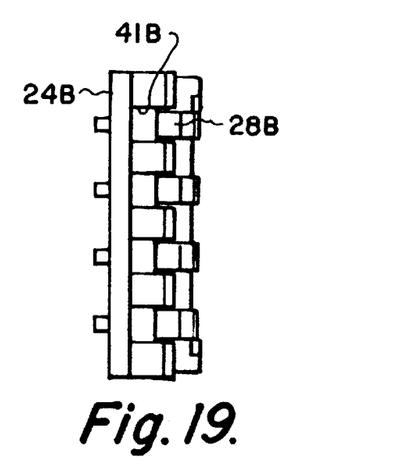
FIG. 19 is a front view of the connector of FIG. 16.

FIGS. 13–15 illustrate a connector switch portion 80 which is similar to that of FIGS. 1–9, except that the switch assembly 82 (FIG. 14) includes an actuator 84 with two elements 86, 88. The first or rear element 86 has a fixed end 48A, a curved connection region 49A, and a main part 50A. The main part includes a bearing location 52A that lies over the center of a dome element 36A. The main part 50A is biased down so it normally keeps the dome in its snapped position to provide a normally closed switch. In the snapped dome position, the center of the dome engages a switch terminal 90 (FIG. 15) to close the switch.

The second or forward actuator element 88 (FIG. 14) has a pair of trunnions 92 that pivotally mount it on the switch body portion 12A. The forward actuator element has a slot 94. The rear actuator element has a front end 96 that lies in the slot and that presses down against a slot wall 98. This keeps a ramp portion 100 of the forward actuator element at the position shown in FIG. 15, wherein it projects above the surface 24A to be depressed by the forward edge of the card C. When the ramp 100 is depressed, i lifts the front end 96 of the rear actuator element 86 to lift the bearing location 52A and allow the switch to open. The main portion 50A of the rear actuator element has two arms 102, 104 with a slit between them, to allow the dome to rapidly unsnap and snap. It is noted that in FIG. 15, the terminal solderable end 35C is raised to enable at least partial insertion of the body 12A in a circuit board hole.

FIGS. 16–19 show a connector 110 that does not have an integral switch, and which has surface mount terminals 28B. Otherwise, the connector is the same as the connector portion of FIG. 1A.

Figure 20:
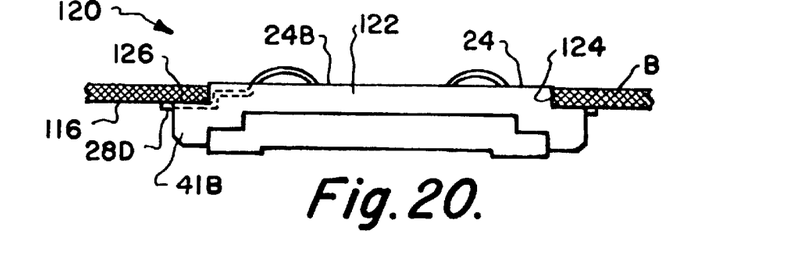
FIG. 20 is a view similar to that of FIG. 16, showing the connector mounted on a circuit board.
Figure 21:
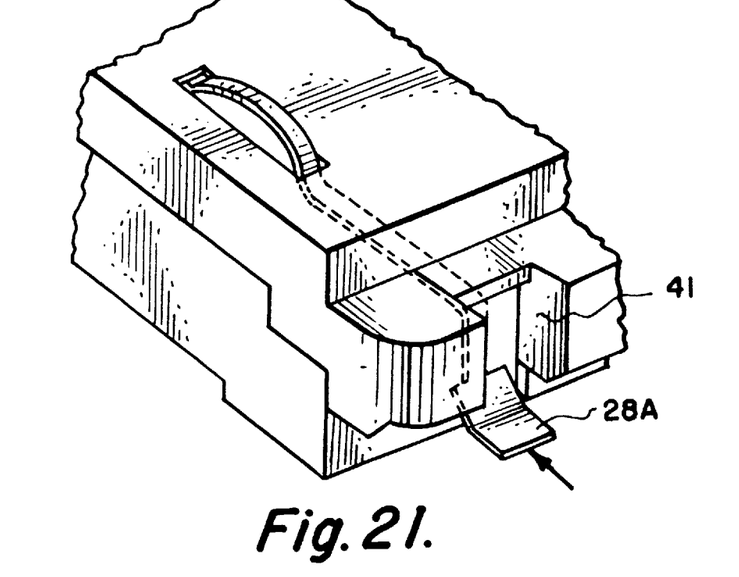
FIG. 21 is a partial isometric view of the connector of FIG. 16.

FIG. 20 shows a modified connector 120 with a connector upper portion 122 lying closely in a hole 124 in a circuit board B, while an upwardly-facing shoulder 126 lies against the board lower surface 116. The terminals 28D are soldered to traces on the lower surface 116 of the board. The terminals or solderable ends 28D lie largely in recesses 41B.

Although terms such as upper and lower have been used to aid in describing the invention, it should be understood that it is possible to use the connector in any orientation with respect to gravity.

Thus, the invention provides a connector for use with a microcircuit card of the type that has contact pads on the card lower face, where the connector has pad-engaging contacts that carry signals only when the card is in its fully inserted position. The connector can integrate a contact body portion that holds the contacts that directly engage the contact pads of the card, with a switch body portion that holds a switch that is operated only when the card has been fully installed. This assures that the relative positions of the switch actuator and contact blades will be accurately fixed. Also, this can provide a common upper surface along which the card moves, to assure that the two upper surface portions are coplanar. The switch body portion is preferably laterally offset from the contacting portion. This simplifies construction of the circuit board onto which the connector is mounted, especially in the case of a connector with surface mount terminals, where cutouts or recesses are provided in the body to leave walls around the end of each terminal while providing vertical access for a heating source. The switch assembly can include an actuator that has a separate arm which operates a snap dome.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector for mounting on a read/write device, to connect to a microcircuit card that has a lower face with contact pads thereon, comprising:

a contact body portion which has an upper face with a plurality of slots therein;

a plurality of contacts mounted in said contact body portion, said contacts having resiliently deflectable blades that project above said contact body portion upper face, with said contacts having terminals for terminating to a circuit board;

a switch body portion which has an upper face;

a switch mounted on said switch body portion, said switch including an actuator with a portion projecting above said switch body portion upper face, and said switch including a plurality of terminals for terminating to the circuit board;

said contact body portion and said switch body portion being integrally molded with their upper faces being coplanar;

said contact body portion has a largely rectangular shape as seen in a plan view, with front and rear ends and first and second opposite sides, said contact body portion having an intersection location at the intersection of said front end and said second side;

said terminals of said contacts lying at said front and rear ends of said contact body portion and said switch terminals lying at a front end of said switch body portion;

said switch body portion projects forwardly and primarily beyond said second side of said contact body portion, from said intersection location, so said switch body portion is offset from said contact body portion, with said actuator lying forward and to one side of said contact blades.

2. Apparatus for mounting on a read/write device that connects to a microcircuit card that has a card front end, comprising:

a switch body which has an upper face;

a switch mounted on said switch body, said switch including a snap dome with a middle and an actuator in the form of a blade of resilient sheet metal, said blade having a rear end fixed to said body and having a first arm extending forwardly from said rear end and having a ramp portion projecting above said switch body portion upper face to be depressed by the front end of a fully inserted card;

said blade having a second arm, with a rear second arm portion that merges with said first arm, and with a front second arm portion that is separated from said first arm by a slot, said front second arm portion lying against said dome middle.

3. An electrical connector for mounting on a board of a read/write device that connects to a microcircuit card that has a lower face with contact pads thereon, comprising a body which includes a contact body portion which has an upper face with a plurality of slots therein, and a switch body portion which has an upper face, with said body portions being integrally molded and being joined at an intersection location;

a plurality of contacts mounted in said contact body portion, said contacts having resiliently deflectable blades that project above said contact body portion upper face, with said contacts having terminals for terminating to said board;

said terminals are surface mount terminals with solderable ends that lie in substantially a horizontal plane when said contact body portion upper face lies in a horizontal plane;

said contact body portion has peripheral regions with a plurality of recesses (41) therein that have recess walls, and said terminal ends lie at least partially within said recesses as seen in a top view of said contact body portion;

a switch mounted on said switch body portion, said switch including an actuator with a portion projecting above said switch body portion upper face to detect the front end of a fully installed card;

said contact body portion has a largely rectangular shape as seen in a plan view, with front and rear ends and first and second opposite sides, said front and rear ends forming said peripheral regions that form said recesses, and said intersection location lies at the front end and second side of said contact body portion;

said switch body portion projects forwardly and beyond said second side of said contact body portion, from said intersection location;

said surface mount terminals lying at the front and rear of said contact body portion, and said switch includes a pair of switch surface mount terminals lying at the front of said switch body portion.

4. An electrical connector for mounting on a read/write device, to connect to a microcircuit card that has a lower face with contact pads thereon, comprising:

a contact body portion which has an upper face;

a plurality of contacts mounted in said contact body portion, said contacts having resiliently deflectable blades that project above said contact body portion upper face, with said contacts having terminals for terminating to a circuit board;

a switch body portion which has an upper face;

a switch mounted on said switch body portion, said switch including an actuator with a portion projecting above said switch body portion upper face, and said switch including a plurality of terminals for terminating to the circuit board;

said contact body portion and said switch body portion being integrally molded with their upper faces being coplanar;

said contact body portion has a largely rectangular shape as seen in a plan view, with front and rear ends and first and second opposite sides, said contact body portion having an intersection location at the intersection of said front end and said second side;

said switch body portion projects forwardly and primarily beyond said second side of said contact body portion, from said intersection location, so said switch body portion is offset from said contact body portion, with said actuator lying forward and to one side of said contact blades.

5. An electrical connector for mounting on a board of a read/write device that connects to a microcircuit card that has a lower face with contact pads thereon, comprising a body which includes a contact body portion which has an upper face and a switch body portion which has an upper face, with said body portions being integrally molded and being joined at an intersection location;

a plurality of contacts mounted in said contact body portion, said contacts having resiliently deflectable blades that project above said contact body portion upper face, with said contacts having terminals for terminating to said board;

said terminals are surface mount terminals with solderable ends that lie in substantially a horizontal plane when said contact body portion upper face lies in a horizontal plane;

a switch mounted on said switch body portion, said switch including an actuator with a portion projecting above said switch body portion upper face to detect the front end of a fully installed card;

said contact body portion has a largely rectangular shape as seen in a plan view, with front and rear ends and first and second opposite sides, said intersection location lies at the front end and second side of said contact body portion;

said switch body portion projects forwardly and beyond said second side of said contact body portion, from said intersection location;

said switch includes a pair of switch surface mount terminals having solderable ends that lie substantially in said horizonal plane.

6. An electrical connector for mounting on a circuit board, where the circuit board lies in a horizontal board plane and has board conductors, where the electrical connector is designed for engaging card contact pads on a face of a card that lies in a horizontal card pad plane, comprising:

an insulative contact body portion which has a card-facing face;

a plurality of contacts mounted on said contact body portion, said contacts having pad-engaging parts projecting beyond said card-facing face to engage said card contact pads, and said contacts having board engaging parts for engaging said board conductors;

a switch body portion;

a switch mounted on said switch body portion, said switch including an actuator positioned to engage and be deflected by said card, said switch having a plurality of switch terminals with board engaging parts for terminating to said board conductors;

said contact body portion has front and rear ends and laterally-spaced first and second opposite sides;

said contact body portion and switch body portion are arranged with said switch body portion being offset in that said switch body portion extends laterally beyond said contact body second side in a direction away from said body first side and said switch body portion extends forwardly of said contact body portion forward end, whereby to provide more room for joining of said terminals to said board conductors.

7. The electrical connector described in claim 6 wherein:

said contacts are arranged in front and rear rows, with the board engaging parts of contacts of said front row lying at the front of said contact body portion and with the board engaging parts of contacts of said rear row lying at the rear of said contact body portion;

said board engaging parts of said switch terminals are laterally offset from said board engaging parts of said front and rear rows of contacts.

* * * * *

UNITED STATES PATENT AND TRADEMARK OFFICE
CERTIFICATE OF CORRECTION

PATENT NO. : 5,807,124
DATED : September 15, 1998
INVENTOR(S) : Hervé Guy Bricaud and Fabrice Valcher It is certified that error appears in the above-identified patent and that said Letters Patent is hereby corrected as shown below:

On the title page, insert the following after item [63]:
   item [30]Foreign Application Priority Data

```
    June 1, 1994  (FR)  France       94-06683
    June 1, 1994  (FR)  France       94-06684
    June 1, 1994  (FR)  France       94-06685
```

Signed and Sealed this

Eighth Day of June, 1999

Attest:

Q. TODD DICKINSON

*Attesting Officer*   Acting Commissioner of Patents and Trademarks